Dec. 2, 1958 A. C. FRESE, JR 2,862,764
AERATING AND BUBBLING ATTACHMENT FOR HOSE
Filed April 23, 1957

Albert C. Frese, Jr.
INVENTOR.

BY *Clarence A. O'Brien*
*and Harvey B. Jacobson*
Attorneys

United States Patent Office 2,862,764
Patented Dec. 2, 1958

2,862,764

AERATING AND BUBBLING ATTACHMENT FOR HOSE

Albert C. Frese, Jr., San Antonio, Tex.

Application April 23, 1957, Serial No. 654,495

8 Claims. (Cl. 299—76)

This invention comprises a novel and useful aerating and bubbling attachment for hose and more particularly relates to a device adapted to be secured to the end of a hose whereby the stream of water from a hose may be aerated and caused to be gently supplied in plural streams to the surrounding area.

The primary purpose of this invention is to provide an attachment for use with garden hose and the like whereby the stream of water delivered by the hose may be effectively aerated and then gently dissipated by the device in a plurality of small streams upon the immediately surrounding area.

A further object of the invention is to provide an attachment in accordance with the foregoing object which will prevent effectively the impinging of the stream of water directly upon the area being watered whereby to avoid erosion or washing of the soil, or damaging small plants.

Yet another object of the invention is to provide an attachment for garden hose and the like which will effectively confine the water from the hose to a predetermined area immediately adjacent the device; will prevent the spraying of the water upwardly from the device; and will aerate the water before the same is dispensed to the surrounding soil.

A still further object of the invention is to provide a device in accordance with the preceding objects which shall be of a simple, lightweight and inexpensive construction, and shall be capable of being formed of a single sheet of material such as aluminum or other lightweight metal, plastic or the like.

More specifically, it is an object of this invention to provide an aerating and bubbling attachment for hoses in which the stream of water from a hose is baffled or deflected back upon itself and into the receptacle for producing turbulence and for effectively aerating the water; together with means whereby the aerated water is gently discharged from the sides of the device in a plurality of small streams without danger of washing the soil around the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
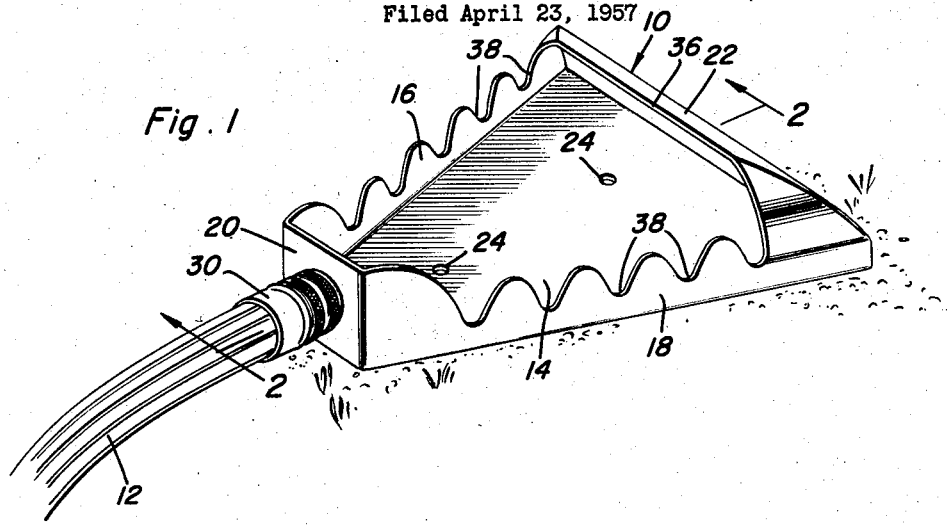
Figure 1 is a perspective view showing a preferred embodiment of aerating device in accordance with this invention and disposed in operative position upon the soil.

In the accompanying drawings, the aerating device indicated generally by the numeral 10 is shown connected to a garden hose 12 or the like whereby water under pressure of any suitable source, not shown, as for example from a hydrant, may be delivered into the device.

In accordance with the present invention, the aerating attachment 10 is preferably formed from a single unitary sheet of thin material such as aluminum or suitable plastic or the like, and comprises a bottom wall 14, a pair of upstanding side walls 16 and 18, together with opposed end walls 20 and 22. The device may also be fabricated in two or more pieces, especially when it is formed of a plastic material.

As will be observed, the bottom 14 is generally triangular in shape, and the upstanding side walls 16 and 18 at the lateral edges of the bottom are disposed at an acute angle with respect to each other. This angle is so chosen that the stream of water emerging from the nozzle of the hose 12 into the receptacle will be provided with ample room for the spray or stream of water to diverge, thereby reducing the force of the flow of the water.

The bottom wall 14 is preferably provided with one or more apertures 24 which are adapted to selectively receive fastening means such as anchor pins or the like whereby the device will be securely held in a fixed position upon the ground; or which may constitute openings for discharging water beneath the device to water or irrigate the soil immediately below the same.

Figure 2:
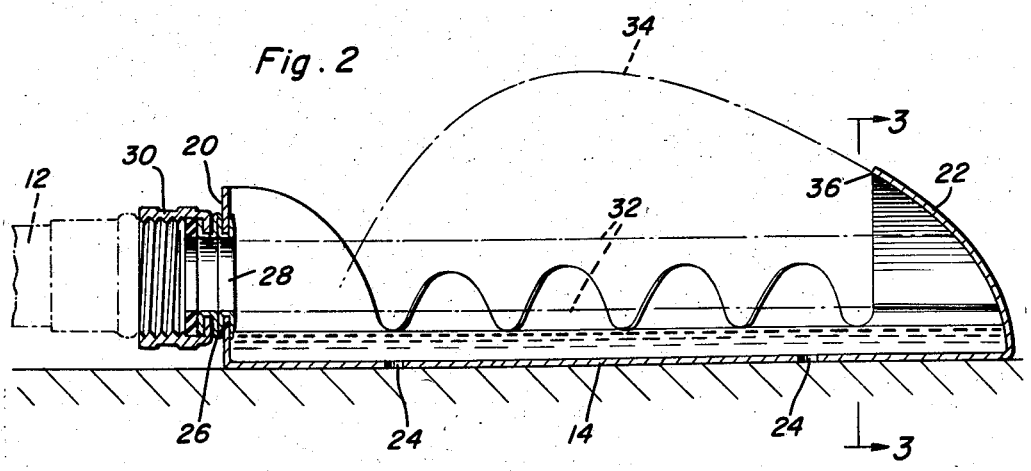
Figure 2 is a detailed view in vertical longitudinal section taken on an enlarged scale substantially upon the plane indicated by section line 2—2 of Figure 1.
Figure 3:
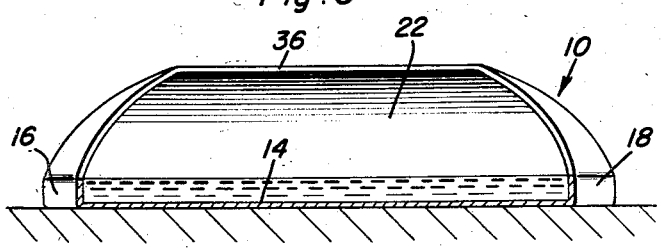
Figure 3 is a vertical transverse sectional view taken substantially upon the plane indicated by the section line 3—3 of Figure 2.

Referring now particularly to Figure 2 it will be seen that the narrower end wall 20 has an opening 26 therein in which is received or secured a sleeve or bushing 28 constituting a means by which a coupling or connecting sleeve 30 may operatively connect the device with the threaded end of the hose 12. The bushing 28 and opening 26 constitutes an inlet means for the device.

The opposed end wall 22, as shown best in Figure 2, curves upwardly and towards the other end wall 20, and is inwardly and upwardly concaved. The shape of this wall is such that the stream from the inlet means, indicated by the lines 32 will impinge upon the concave end wall 22 and will then be directed backwardly and upwardly upon itself as indicated by the line 34, to thus fall into the interior of the receptacle, thereby promoting turbulence therein and effecting an aeration of the water.

As seen from the drawings the upper edge or lip 36 of the concave end wall 22 overlies the bottom wall 14 while the side walls 16 and 18 adjacent the end wall 22 extend upwardly to merge into the end wall thereby imparting rigidity to the construction and insuring that there will be no spray produced by the impingement of the stream upon the concave wall from departing from the receptacle over the sides of the same.

The upper edges of the two side walls 16 and 18 are provided with suitable notches or recesses 38 therein providing means whereby the aerated water within the receptacle may be discharged from the sides in a plurality of streams with a gentle flow, to the area immediately surrounding the device.

As will be best apparent from Figure 2, it will be observed that the scalloped or notched portions of the side walls are of less vertical height than those portions of the side walls which adjoin the two end walls 20 and 22, thereby insuring the discharge of the water through the notches or recesses and preventing the establishing of a water level within the device which is sufficiently high to interfere with the flow of the stream of water directly against the concave end wall 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aerating and bubbling attachment for hoses comprising a relatively shallow and flat receptacle comprising a bottom, a pair of side walls and a pair of opposed end walls rising from said bottom, one of said end walls having an inlet means including a connection for receiving thereon the end of a hose for supplying water under pressure to said receptacle, the other end wall being upwardly concave for directing a stream of water from said inlet means back upon said bottom whereby to create turbulence and aerate the water in said receptacle, said side walls having downwardly extending notches in their upper edges whereby to effect a gentle discharge in plural streams of the aerated water in said receptacle.

2. The combination of claim 1 wherein said side walls diverge outwardly at an acute angle from the end wall having said inlet means to the opposite end wall.

3. The combination of claim 1 wherein said concave end wall has its upper edge overlying said bottom and is joined to said side walls.

4. The combination of claim 1 wherein said receptacle comprises a single sheet of material.

5. The combination of claim 1 wherein said receptacle comprises a single sheet of material, said one end wall having an opening therein, said inlet means comprising a sleeve secured in said opening and extending exteriorly of said receptacle.

6. The combination of claim 1 including apertures in said bottom comprising means selectively for receiving fasteners to anchor said receptacle and for watering the soil beneath said bottom.

7. An aerating and bubbling attachment for hoses comprising a relatively shallow and flat receptacle comprising a bottom, a pair of side walls and a pair of opposed end walls rising from said bottom, one of said end walls having an inlet means including a connection for receiving thereon the end of a hose for supplying water under pressure to said receptacle, the other end wall being upwardly concave for directing a stream of water from said inlet means back upon said bottom whereby to create turbulence and aerate the water in said receptacle, said side walls having water discharge openings in spaced relation along the length thereof and disposed in spaced relation below the top of said side walls whereby to effect a discharge in plural discrete streams of the aerated water in said receptacle.

8. The combination of claim 7 wherein said receptacle is open and unobstructed at its top except for said other end wall.

References Cited in the file of this patent

UNITED STATES PATENTS

| | | |
|---|---|---|
| 159,156 | Corey | Jan. 26, 1875 |
| 544,928 | Patterson | Aug. 20, 1895 |
| 820,328 | Alderman | May 8, 1906 |
| 930,926 | Bentley | Aug. 10, 1909 |
| 2,065,549 | Balensiefer | Dec. 29, 1936 |
| 2,791,466 | Crisp | May 7, 1957 |